Aug. 5, 1941.  D. R. HUCKE  2,251,488
VARIABLE SPEED DRIVE
Filed May 18, 1940
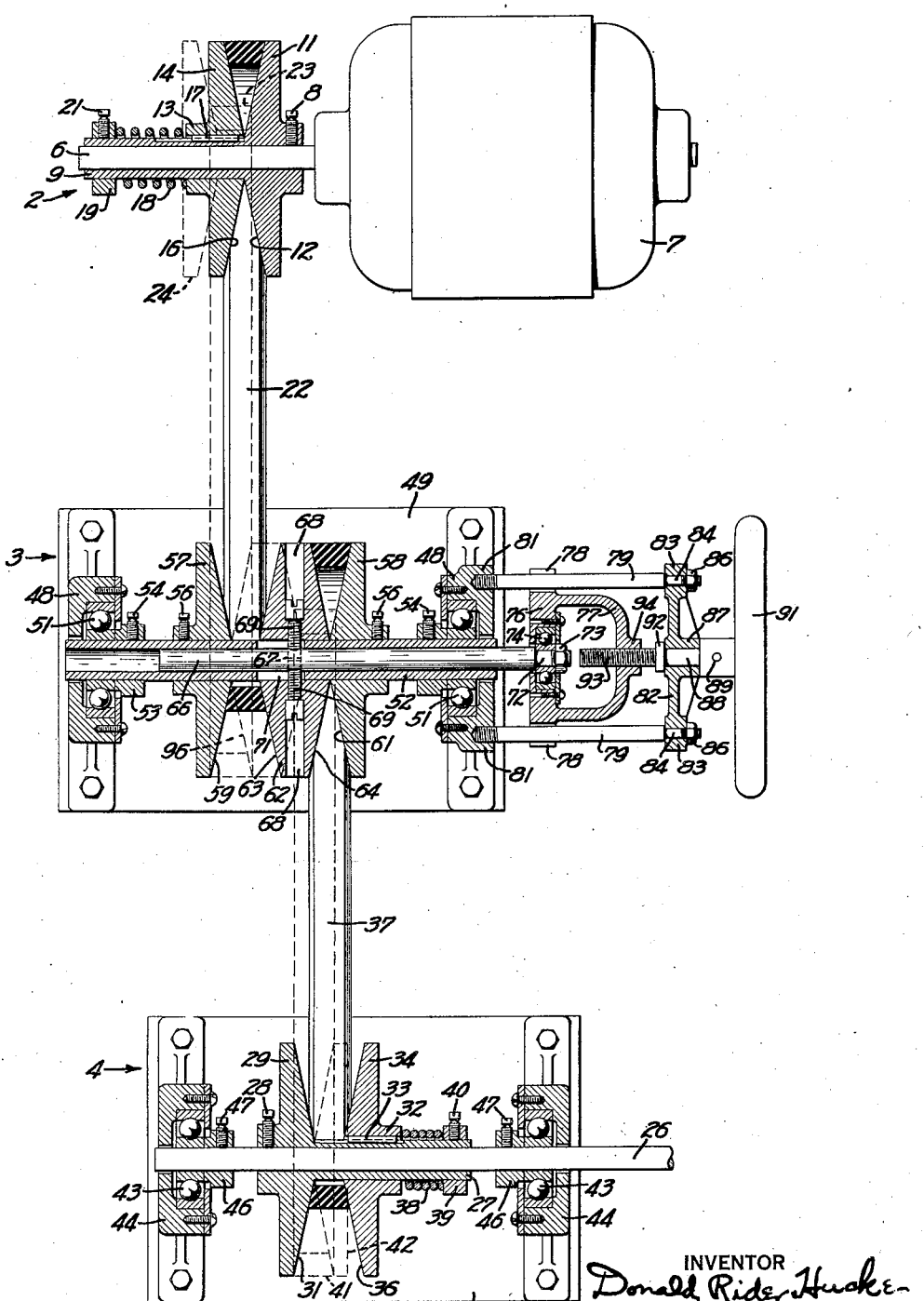
INVENTOR
Donald Rider Hucke
BY
Harry Schroeder
ATTORNEY Patented Aug. 5, 1941

2,251,488

UNITED STATES PATENT OFFICE 2,251,488

VARIABLE SPEED DRIVE

Donald Rider Hucke, Oakland, Calif.

Application May 18, 1940, Serial No. 335,961

1 Claim. (Cl. 74—230.17)

This invention relates to power transmissions for frictionally connecting separate shafts for rotation together and has particular reference to means for selectively varying the rotational drive ratios between the shafts.

It is an object of the invention to provide an improved speed changing transmission for use with so-called V belts.

Another object of the invention is to provide, in a power drive mechanism comprising spaced drive and driven shafts which are belt-connected through an intermediate countershaft, means for effecting ratio changes between the drive and driven shafts without disturbing their spaced relation with respect to the countershaft.

A further object of the invention is to provide, in a device of the character described in which belts may be moved with respect to their pulleys so as to vary, radially of the pulleys, the respective points of frictional engagement of the belts therewith, means for maintaining the belts always at right angles to the rotational axes of the pulleys through the entire range of movement of the belts.

A still further object of the invention is to provide, in a device of the character described, including a countershaft equipped with a dual pulley composed of a pair of pulley members, fixed to and spaced axially of the shaft, having coned confronting faces, and an intermediate correspondingly coned disk which is slidable axially of the shaft between the pair of pulley members so as to provide in conjunction with the pulley members a pair of pulleys having different effective diameters, means for positively positioning the said coned disk so that it may not be shifted axially of the shaft by variations in belt tension caused by fluctuations in torque or load.

The invention possesses other objects and features of advantage which, together with the foregoing, will be specifically pointed out in the detailed description of the preferred form of the invention hereunto annexed. It is to be understood that the invention is not to be limited to the specific form thereof herein shown and described as various other embodiments thereof may be employed within the scope of the appended claim.

Referring to the drawing the figure is a top plan view, partly in horizontal section, showing a variable speed drive including the improvements of my invention.

There is, on the market at the present time, a number of speed change transmissions which employ drive belts, having a keystone-shaped cross-section and which are commonly referred to as V belts, connecting a drive shaft with a driven shaft through an intermediate countershaft. The pulleys used in these transmissions are each composed of a pair of disks having coned confronting faces so as to form a peripheral groove having tapered sides complementary with the included angle of the inclined sides of the belt. At least one of these disks is movable axially of the shaft so as to widen the peripheral groove and allow the bight of the belt to be moved from an outer extreme position, wherein the belt engages the disks adjacent their peripheries, to an inner extreme position wherein the bight is brought as close to the center of the disks as possible. It will be seen that movement of the belt relative to the pulley in this manner provides for progressive changes in the effective diameter of the pulley from a maximum, when the belt is in its outer extreme position, to a minimum, when the belt is in its inner extreme position. Usually, all of the pulleys on the drive shaft, driven shaft and countershaft are of this adjustable nature so that the drive ratio between the drive and driven shafts may be selectively varied between the limits of adjustment of the pulleys. The most simple means of varying the ratio between the shafts, and one which is employed by a number of prior art devices, is to fixedly mount the drive and driven shafts against relative displacement and arrange the countershaft to be shifted axially transversely toward or from the drive or driven shafts. The countershaft, in such a structure, is usually provided with a dual pulley having a pair of coned outer disks and an intermediate inner disk whose opposite faces are similarly coned and which is free to float on the countershaft axially toward and from each of the outer disks. The intermediate disk therefore serves as a common pulley member which engages one side of each of the oppositely directed belts in tractional engagement with the countershaft. If one of these belts is arranged with its bight in the inner extreme position, and the other belt with its bight in the outer extreme position, it will be seen that, by merely moving the countershaft in an axially transverse direction, the positions of the belts may be progressively altered, the smaller bight gradually increasing in radius until it reaches the outer extreme position and the larger bight correspondingly and simultaneously decreasing in radius until it reaches its inner extreme position. While this alteration of belt condition is taking place, the floating intermediate coned disk is shifting axially of the countershaft, being at all times in tractional engagement with both of the belts. Of course, the drive and driven shafts are each provided with automatically variable pitch pulleys, as shown in the drawing, in order to make this change of speed ratio possible.

There are two undesirable features inherent in the shifting countershaft type of speed transmission. The first of these is that a rather complicated structure is required, to mount the countershaft for trans-axial movement, which complicates the transmission, requires excessive room and adds considerably to the total cost of the device. The second and most undesirable feature is that, due to the presence of the floating intermediate pulley disk on the countershaft, any suddenly imposed load on the driven shaft will suddenly increase the tension of the belt connecting the latter shaft with the countershaft thereby creating an axial thrust shock on the floating disk which will, in turn, transmit a like shock to the belt between the countershaft and the drive shaft. The result is that the set speed ratio will fluctuate perceptibly and will continue to do so as long as the floating disk "hunts" back and forth until it again reaches a state of equilibrium.

I have overcome these objectionable features in the device of my invention. In detail, I have shown three separate organizations which will be referred to as the driving unit 2, the speed-change unit 3 and the driven unit 4. The driving unit comprises a drive shaft 6, which is connected either directly, or through a suitable transmission system, with a prime mover, such as the motor 7, to be rotated thereby. Suitably secured, as by means of the setscrew 8, to the drive shaft 6, for rotation therewith, is a sleeve 9 having adjacent one end thereof a radially extending fixed pulley flange 11 having one face 12 thereof angularly inclined with respect to the axis of the shaft to form a cone. A centrally bored hub 13, concentric with and slidable axially of the sleeve 9, is provided with a radially extending flange 14 which has one face 16, confronting the flange 11, angularly inclined with respect to the axis of the drive shaft to form a cone similar, but inclined oppositely, to the coned face of the flange 11. The coned faces 12 and 16 of the flanges form a V-shaped peripheral groove in the drive pulley. The hub 13 is secured against relative rotation with respect to the sleeve 9 by a key 17, which allows for free relative axial movement between the hub and sleeve, and a coil spring 18, interposed between an end of the hub 13 and a collar 19, which is secured to the outer end of the sleeve by means of a setscrew 21, forcibly urges the flanges 11 and 14 of the pulley toward each other. One bight of a V drive belt 22 is tractionally engaged in the peripheral groove of the drive pulley, and it will be seen that if tension is applied to the reaches of the belt to force the belt deeper into the V-shaped groove of the pulley, toward the apexes of the coned faces 12 and 16, the flanges 11 and 14 will be gradually spread apart, axially, against the tension of the spring 18 until the belt reaches its inner extreme position as indicated by the dotted lines 23 and the flange 14 assumes the position indicated by the dotted lines 24. The effective diameter of the drive pulley may thus be varied from maximum to minimum in proportion to the amount of tension in the belt 22 trans-axially of the drive shaft 9.

The driven shaft 26, which may be connected to any apparatus to be driven, is equipped with a pulley, similar to the drive pulley, comprising a sleeve 27, which is secured to the shaft by means of a setscrew 28, having a radially extending flange 29 which has a coned face 31. A hub 32, slidable axially of the sleeve 27 and having a key 33 which secures the hub and sleeve together against relative rotation, is provided with a radially extending flange 34 also having a coned face 36. These coned faces 31 and 36 form, as in the drive pulley, a V-shaped peripheral groove in the driven pulley in which one bight of a driven belt 37 is tractionally engaged. A coil spring 38 is interposed between an end of the hub 32 and a collar 39 which is secured, by means of a setscrew 40, to an end of the sleeve 27. As in the case of the drive pulley, tensioning of the driven belt 37 will cause the bight thereof to work from its outer extreme position shown by the dotted lines 41 to its inner extreme position shown by the solid lines. When the bight is in its outer extreme position, the flange 34 will be urged by the spring 38 to assume the position shown by the dotted lines 42. As will be seen, both the drive and driven shaft pulleys are identical except that the flange 14 of the drive pulley is capable of movement to the left, as viewed in the drawing, while the flange 34 of the driven pulley is movable toward the right. The driven shaft is mounted for rotation in suitable journals, such as the ball bearings 43, provided in bearing brackets 44 mounted on a suitable base 45, and collars 46, which are secured to the shaft by setscrews 47, engage the respective bearings 43, or portions of the brackets 44, to prevent axial movement of the shaft with respect to its bearing mount.

I do not claim origination of the variable pitch pulleys just described as these are old and well known in the art. However, their detailed description is necessary to a thorough understanding of the novel portions of the apparatus with which they are combined and which will now be described.

The speed-change unit comprises a pair of spaced brackets 48, which may be supported on a suitable base 49, containing journals, such as the ball bearings 51, in which the opposite ends of a tubular countershaft 52, which is positioned intermediate, and parallel to, the drive and driven shafts, is mounted for rotation. Collars 53, which are secured by means of setscrews 54 to the countershaft, engage the bearings 51, or other portions of the brackets 48, so as to prevent axial movement of the countershaft in its journals. Secured, by means of setscrews 56, to the countershaft, and relatively spaced axially of the latter, is a pair of disks 57 and 58 each having a confronting face 59 and 61 thereof angularly inclined, or coned, similar to the flanges of the drive and driven pulleys. Disposed between the disks 57 and 58, and slidable axially of the countershaft, is a shiftable disk 62 having the radial faces 63 and 64 thereof angularly inclined, with respect to the axis of the countershaft, complementarily with the faces 59 and 61 of the disks 57 and 58. The spacing, axially of the countershaft, between the disks 57 and 58 is such that when the bight of the drive belt 22 is in its inner extreme position, as shown in the drawing, the bight of the driven belt 37 will be in its outer extreme position, as shown, and vice versa.

Means is provided for moving the shiftable disk 62, to vary the effective diameters of the belt pulleys, and for securely maintaining the disk in any of its positions to which it may be adjusted. Concentric with, and slidable axially of, the tubular countershaft 52 is a shift rod 66 provided intermediate its ends with a transversely drilled aperture 67. The disk 62 has a pair of diametrically opposed bores 68 therein each having portions thereof adjacent the center of the disk threaded so as to receive threaded screws 69 which extend through elongated slots 71, formed in the countershaft, and enter the aperture 67 of the shift rod thus connecting the shift rod and the disk 62 for movement axially of the countershaft. The outer end of the shift rod 66 is provided with a shoulder 72, which is secured by a nut 73 in a ball bearing 74 enclosed within a recess formed in the cross bar 76 of a yoke 77 which has slotted ears 78 extending from opposite ends thereof and straddling guide rods 79 threadedly secured at one end in bosses 81 formed on one of the bearing brackets 48. A tie bar 82, which has, at opposite ends thereof, apertured bosses 83 engaging shoulders 84, formed at the outer ends of the guide rods 79, and secured thereon by nuts 86, is provided with a central bored hub 87 in which a cylindrical shank 88, to which is secured, by a pin 89, a handwheel 91, is journaled. The shank 88 is provided with an integral collar 92, engaging one face of the hub 87, and with an integral threaded stem 93 which passes through a complementarily threaded aperture provided in a boss 94 formed on the yoke 77. It will be seen that, by rotating the handwheel 91, the yoke 77 may be caused to move axially along the guide rods 79 thereby imparting axial movement to the shifting rod 66 and causing the shiftable disk 62 to be moved between one extreme position adjacent the disk 58, in which it is shown by the solid lines of the drawing, to an opposite extreme position adjacent the disk 57 in which it is shown by the dotted lines 96. It will also be seen that after the shiftable disk 62 has been adjusted to a position between the fixedly spaced disks 57 and 58, its position relative to the latter disks may be altered only by further manipulation of the handwheel. Thus the position of the shiftable disk cannot in any way be affected by variations in belt tension, and consequently the adjustment of the transmission will remain constant under all conditions of load.

It will be seen that, for example, when the handwheel 91 is rotated to cause the shiftable disk 62 to move from its right hand position shown in the drawing to its left toward the disk 57 and away from the disk 58, the pressure of the faces 59 and 63 against the tapered sides of the belt 22 will be increased to a degree exceeding that exerted against the sides of the belt by the faces 12 and 16 of the drive pulley. This will cause the countershaft bight of the belt 22 to move radially of the disks toward its outer extreme position. Simultaneously, the tapered faces 61 and 64 of the disks 58 and 62, in receding from each other, will allow the bight of the belt 37 to move radially of the disks toward its inner extreme position. This produces a condition of maximum speed reduction between the drive shaft 6 and the driven shaft 26. It will be noted, as shown by the dotted line positions of the parts in the drawing, that in moving from one extreme position thereof to the other, the belts move transversely only a distance equal to about one-third of their width and that in all positions during such movement, they are always at right angles to the axes of the connected shafts. This, in obviating any lateral flexing of the belts enables the latter at all times to transmit a maximum of power without undue slippage.

Having thus described my invention in detail, what I claim as new and desire to secure by Letters Patent is:

In a variable speed device, including spaced drive and driven shafts each being provided with a variable pitch V-belt pulley, a fixed support having journals therein, a tubular countershaft mounted in said journals and axially parallel with the drive and driven shafts, said countershaft having intermediate its ends one or more elongated axially extending slots, a pair of axially spaced cone-faced pulley disks mounted on said countershaft adjacent said slots thereof, a shiftable pulley disk, having opposite coned faces, slidably mounted on said countershaft and positioned between said cone-faced pulley disks, endless belts tractionally engaged with said spaced pulley disks and shiftable disk and the respective variable pitch pulleys of the drive and driven shafts, a shift rod slidably mounted within said tubular countershaft, pins passing through said countershaft slots and engaged at their opposite ends in said shift rod and shiftable pulley disk so as to secure the shiftable pulley disk and shift rod for movement together, a pair of guide rods mounted on and extending from said support, a yoke slidably mounted on said guide rods, means connecting said yoke and an end of said shift rod together for relative rotation, a tie-bar secured to said guide rods, a screw journaled in said tie-bar and threadedly engaged with said yoke, and means for rotating said screw.

DONALD RIDER HUCKE.